2 Sheets—Sheet 1.
A. E. BROWN.
Truck Apparatus for Lifting and Conveying Weights.
No. 9,332. Reissued Aug. 3, 1880.
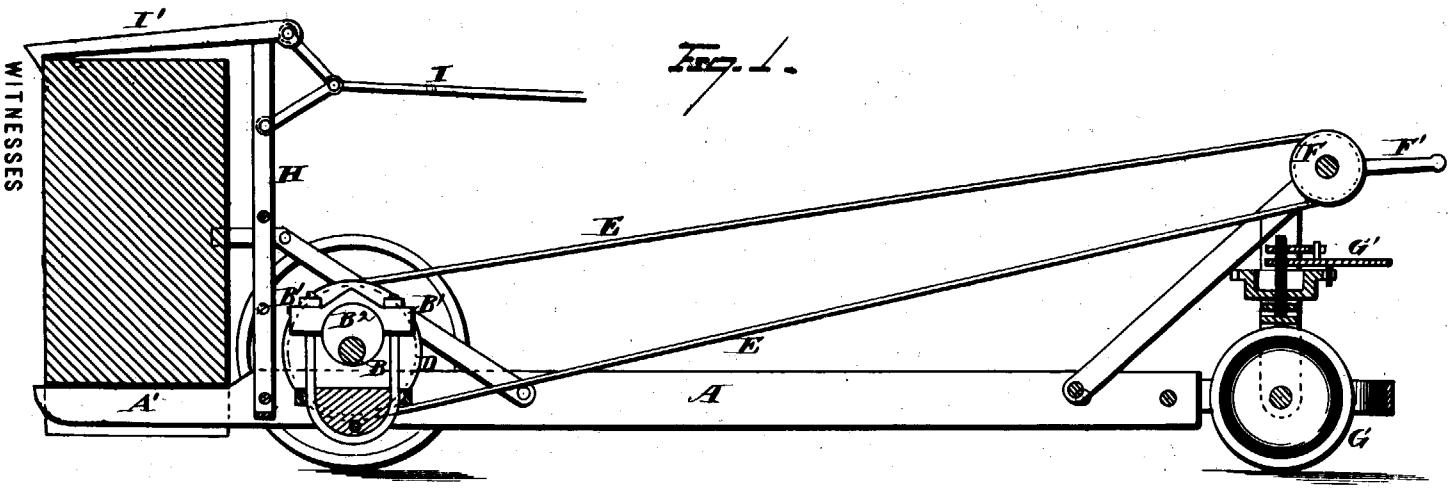
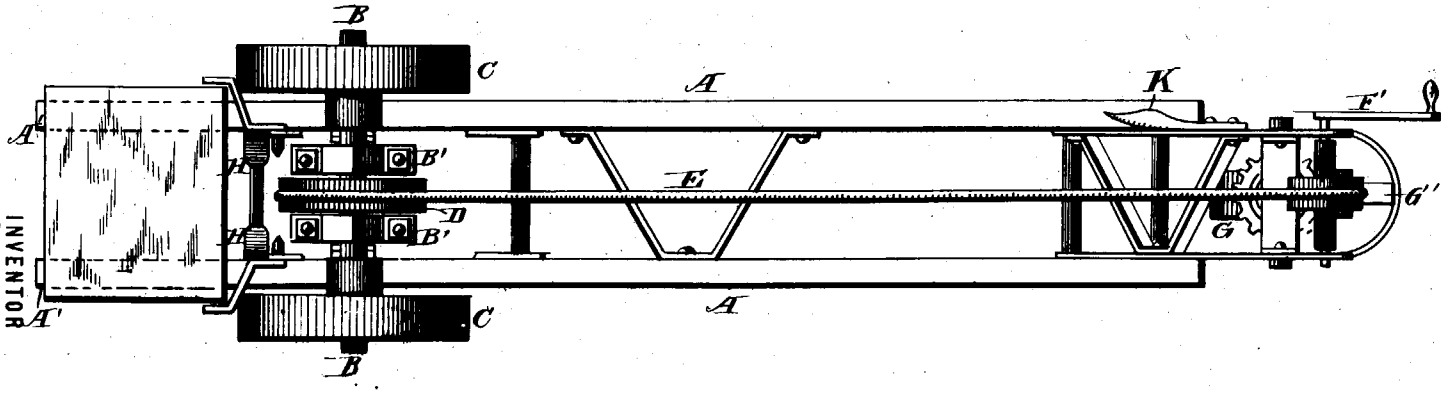
WITNESSES
E. J. Nottingham
Geo. T. Seymour
INVENTOR
A. E. Brown.
By Seagroves & Seagroves ATTORNEYS.

A. E. BROWN.

Truck Apparatus for Lifting and Conveying Weights.

No. 9,332. Reissued Aug. 3, 1880.

WITNESSES

E. J. Nottingham

Geo J Symour

INVENTOR

A E Brown.

By Sewgett & Sewgett ATTORNEYS.

UNITED STATES PATENT OFFICE.

ALEXANDER E. BROWN, OF CLEVELAND, OHIO.

TRUCK APPARATUS FOR LIFTING AND CONVEYING WEIGHTS.

SPECIFICATION forming part of Reissued Letters Patent No. 9,332, dated August 3, 1880.

Original No. 202,222, dated September 24, 1878. Application for reissue filed November 11, 1878.

*To all whom it may concern:*

Be it known that I, ALEXANDER E. BROWN, of Cleveland, in the county of Cuyahoga and State of Ohio, have invented certain new and useful Improvements in Lifting-Machines; and I do hereby declare the following to be a full, clear, and exact description of the invention, such as will enable others skilled in the art to which it pertains to make and use it, reference being had to the accompanying drawings, which form part of this specification.

My invention relates to an improved device for lifting weights and conveying them from place to place; and it consists in a wheel-truck the forward axle of which is made to support the lifting arm or bracket, the said axle being turned eccentrically along those parts which receive the suspenders, and mechanism for turning said axle in its bearings, so that the eccentrics may operate to lift the weight.

Figure 3:
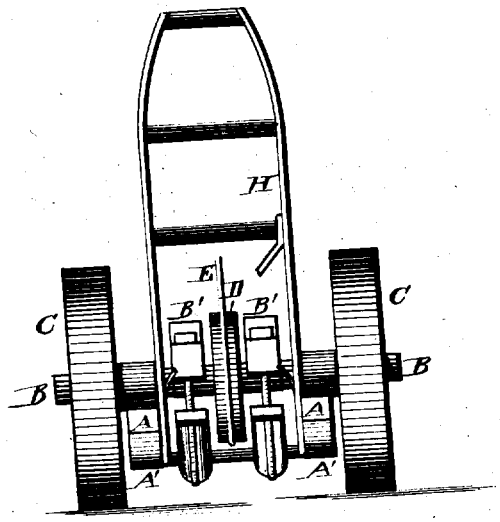
Figure 4:
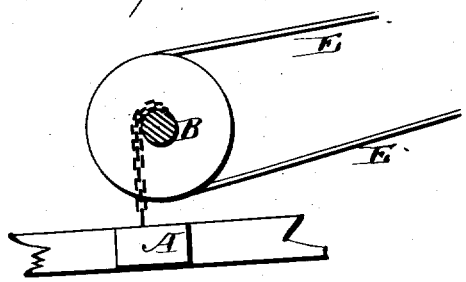

In the drawings, Figure 1 is a longitudinal central section, exhibiting my improved lifting and conveying apparatus in detail. Fig. 2 is a plan view of the same; Fig. 3, an end view. Fig. 4 is a detail view of a modification of the invention.

This invention was designed more especially for the purpose of lifting pots or vessels from hot furnaces—as for instance, such as are employed in the annealing-furnaces of malleable-iron works—or for handling ingots and ingot-molds in the manufacture of steel, and for other like purposes; but it is equally well adapted for the purpose of lifting and conveying weights of any nature; and I do not limit myself to its employment in any particular locality.

The structure may be varied considerably without departing from my invention. The device which I have shown in the drawings is as follows: A is a suitable frame-work, of iron or other suitable material, which possesses sufficient strength at its ends A′ to bear up the weight to be lifted and transferred. This frame A is suspended beneath an axle, B, by stirrups B′, which stirrups, at their top, have a bearing upon the axle B. The truck-wheels serve to make the device portable, and are journaled upon the axle B. At $B^2$, beneath the stirrups B′, the axle is turned eccentrically midway of the axle, and fastened rigidly to the latter is a band-wheel, D, over which passes the band, or preferably the chain E, which passes back to the pulley F. This pulley is located upon a shaft, and governed by a crank, F′. With this crank F′, through the medium of the belt E, the band-wheel D, and with it the axle B, may be turned, and as the axle B is turned the eccentric $B^2$ upon the axle will lift or lower the frame A.

G is a pilot-wheel, and G′ any suitable lever and clamp mechanism for turning the wheel, and thereby governing the direction of travel of the vehicle.

H is an upright bracket located just in front of the axle B, and of any suitable construction, to assist in supporting the weight as it is being transferred, and for this purpose, if desired, there may be the additional security of a rope or chain, I, and hook I′, which may or may not be employed, nor is the upright H absolutely essential, though desirable in some cases.

I will now proceed to describe its operation: Where it is desired to lift a given weight the vehicle is run forward until the prongs A′ are adjacent to the object to be lifted. The crank F is then turned until the eccentrics $B^2$ permit the prongs to drop beneath the weight or to the level of suitable recesses provided for the reception of the prongs. The vehicle is then pushed forward, and the prongs A′ run beneath the weight. The crank F is then again turned, revolving the axle B until its eccentrics present upward, thus lifting the frame A and lifting up the weight. The vehicle is then run back upon the truck-wheels C to the place where it is desired to deliver the weight. The crank F is then again turned, and the action of the eccentrics $B^2$ will lower the frame until the weight rests upon the ground or floor. The carriage is then run back, and is ready for use again.

This device is especially applicable in locations where the weight to be handled is hot or not directly accessible by reason of the heat surrounding it—as for instance in malleable-iron works, where the castings are put into suitable pots or vessels, and in that condition are placed in an annealing-furnace, which is heated to a high heat.

Heretofore it has been customary, after the annealing process has progressed to a sufficient extent, to break down the door of the annealing-chamber and then permit the furnace to cool. This cooling process consumes a great deal of time. It has then been customary for the workmen to go into the chamber, and, lifting the receptacle by means of pinch-bars, &c., upon iron rolls, roll it out from the chamber—another tedious operation, and frequently accompanied by damage to the castings. Then, after recharging the furnace, it takes considerable time to reheat. But with my device, if the receptacles are properly fashioned or the chamber properly formed to admit of the introduction of the prongs A′ beneath the receptacle, all that is necessary to be done is simply to remove one of the doors and push the machine into the opening while the operator is back at the rear end of the machine a sufficient distance to be out of the influence of the great heat. He may with this apparatus remove the vessel without reducing the heat and without cooling the chamber. He can do it very rapidly, and recharge the furnace in the same way, keeping the furnace all the while hot. So, in like manner, he can very conveniently handle the hot ingots or the ingot-molds in the manufacture of steel; or the device may be employed in any locality where weighty articles are required to be lifted and transported to other localities. If the chain E is employed, then the wheel D and pulley F are preferably made in the nature of spur-wheels, so adapted that the spurs shall enter the links of the chain and prevent the chain from slipping.

K is a catch or fastening, of any suitable nature, for holding the crank F′, or for holding the eccentrics in position while the object lifted is being transferred from place to place.

The rear part of the frame A may be made sufficiently long or sufficiently heavy to counterbalance the weight that is to be lifted.

I would have it understood that I do not limit myself to the precise construction adjacent to the weight to be lifted, for it is apparent that the object may be accomplished in many ways substantially the equivalent. For instance, the axle B may be simply the axle for the truck-wheels, and not be provided with eccentrics; but, on the contrary, the said axle may support bearings which, in turn, would receive the eccentric-shaft, to which latter shaft the frame A might be attached and the same object be accomplished.

Fig. 4 represents, in detail form, a modification of the invention, wherein the lifting-frame is connected with a plain axle-shaft by a chain or other flexible fastening, said plain axle being provided with the band or chain wheel by which the same is actuated in rotary movement, tending to raise or lower the lifting-frame.

It will be observed that the rear end of this frame is supported by a suitable pilot-wheel, and that in the operation of lifting the frame A is caused to rise and fall about the axle of this pilot-wheel G as a pivotal center. Moreover, the operator, being at or near the pilot-wheel, may, by turning the crank F′, operate mechanism in the vicinity of the truck-wheels C adjacent to the weight to be lifted, and thereby cause the forked or lifting end of the frame to rise and lift the weight. This is an important and essential feature of my invention, viz: So to construct the apparatus that the lifting-frame is supported by trucks at or near the weight to be lifted, yet in lifting the whole frame turns about the rear end or pilot-wheel, which remains stationary as a pivot, and the lifting mechanism adjacent to the weight is actuated by the operator from a distant point, to wit, the rear end of the frame at or near the pilot-wheel.

What I claim is—

1. A device for lifting and transferring weights, consisting of a lever-frame swinging vertically from a point at its rear or pilot-wheel end, said frame mounted on truck-wheels located near its forward or lifting end, and having its portions on each side of said truck-wheels so proportioned and constructed that the resultant weight behind said truck-wheels shall be at least sufficient to counterbalance the maximum weight to be lifted at the opposite free or moving end in front of said truck-wheels, in combination with lifting mechanism situated adjacent to said truck-wheels, said lifting mechanism constructed to raise and lower the forward end of said frame and said lifting mechanism, also constructed and suitably connected in such a manner as to be operated and controlled from a point at or near the rear end of said lever-frame, substantially as and for the purposes shown.

2. In a lifting and conveying device, the combination of the following elements, to wit: first, a lever-frame supported near the front or projecting end by truck-wheels, its rear end resting upon a pilot or caster wheel adjacent to which it is pivoted; second, a projecting portion of said lever-frame extending in front of said truck-wheels and constructed to receive and carry the weight to be lifted and moved; third, mechanism for lifting and lowering said lever-frame, said mechanism supported by and situated adjacent to said truck-wheels; fourth, mechanism located at or near the rear end of said lever-frame for operating said lifting mechanism, and being connected with said lifting mechanism in such a manner that a workman from the rear end of said lever-frame can operate the said lifting-mechanism, and thus raise and lower the forward end of said lever-frame, substantially as shown.

In testimony whereof I have signed my name to this specification in the presence of two subscribing witnesses.

ALEXANDER E. BROWN.

Witnesses:

JNO. CROWELL, Jr.,

WILLARD FRACKER.